Sept. 10, 1963 S. S. DAUGHERTY 3,103,074

BRAILLE TAPE READER

Filed Nov. 28, 1960 2 Sheets-Sheet 1

INVENTOR.
SAMUEL S. DAUGHERTY

BY William R. Nolte

AGENT

Sept. 10, 1963 S. S. DAUGHERTY 3,103,074

BRAILLE TAPE READER

Filed Nov. 28, 1960 2 Sheets-Sheet 2

INVENTOR.
SAMUEL S. DAUGHERTY

BY William R. Nolte
AGENT

United States Patent Office 3,103,074
Patented Sept. 10, 1963

3,103,074

BRAILLE TAPE READER

Samuel S. Daugherty, Ivyland, Pa., assignor to Burroughs Corporation, Detroit, Mich., a corporation of Michigan Filed Nov. 28, 1960, Ser. No. 72,009
5 Claims. (Cl. 35—35)

This invention relates to apparatus for moving a record medium having information recorded thereon whereby certain advantages are accrued for sensing such information.

In particular, this invention relates to a mechanism whereby intelligence recorded in a record strip or tape in the form of raised Braille characters is presented for scanning at a rate agreeable with the capabilities and under the control of the operator who is sensing the information. A device of this type is particularly suited for use by those who are blind.

Normally information has been made available to the blind by means of acoustical devices, by Braille characters embossed into stiff paper sheets bound together into book form, or by punched tape apparatus in which groups of pins carried by a rubber belt are actuated in accordance with the information in the punched tape. All of the above or similar methods are costly, fragile and complicated. Further disadvantages of the latter punched tape apparatus reside in the need for intermittent advancement of the tape to allow step-by-step presentation of the information, its noisy operation, which tends to distract the user, and the wear and breakage factors to which the pins and belt are subjected. It is therefore an object of the present invention to provide apparatus of greatly simplified and improved construction and arrangement of parts.

It is another object of this invention to provide a novel device for advancing a strip or tape having intelligence recorded thereon in the form of raised Braille characters so that the same may be readily sensed while in motion in the device.

It is another object of this invention to provide a device for normally advancing a tape having intelligence recorded thereon in the form of raised Braille characters to permit continuous sensing of the same by an operator and wherein the operator may stop the movement of the tape by pressure engagement of the operator's fingers on the tape.

It is still another object of this invention to provide a device for normally advancing a tape bearing intelligence thereon in the form of raised Braille characters so that the fingers of one hand of a person skilled in reading Braille characters may sense the characters and may interrupt the advancement of said tape by pressing the tape against the device to permit the fingers of the other hand of the operator to scan and sense again a portion of the tape so stopped.

In accordance with the above objects and first briefly described, the invention in one mode of operation comprises means for advancing a record medium, bearing indicia which may be in the form of Braille characters, in a manner to permit a hand or hands of an operator to sense the characters while the tape is in motion; and in an alternate mode of operation, in the event a word or character is missed, to permit the operator to apply finger pressure of one hand against the tape to stop the tape thereby enabling the fingers of the other hand of the operator to be moved over the stopped tape to sense the characters thereon, and upon release of said finger pressure by said one hand, to permit the feed of said tape to start again for sensing in said one mode of operation.

The invention may be more fully understood by referring to the accompanying drawings which illustrate a preferred arrangement in which.

Figure 1:
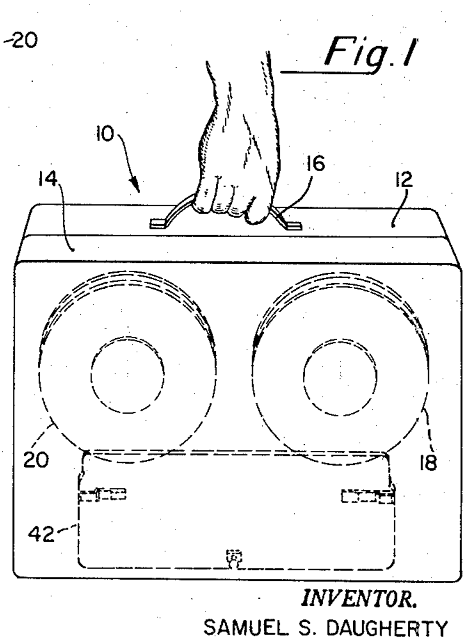
FIG. 1 is a view showing the apparatus of the present invention embodied in a portable carrying case.

With reference first to FIG. 1, the case 10 of the apparatus, which may be of suitable shape and materials, is in two parts, the first or case part being designated by the reference numeral 12 and the second part constituting a cover designated by reference number 14. A handle 16 secured to the case portion 12 enables the operator to carry the case from one location to another.

Figure 2:
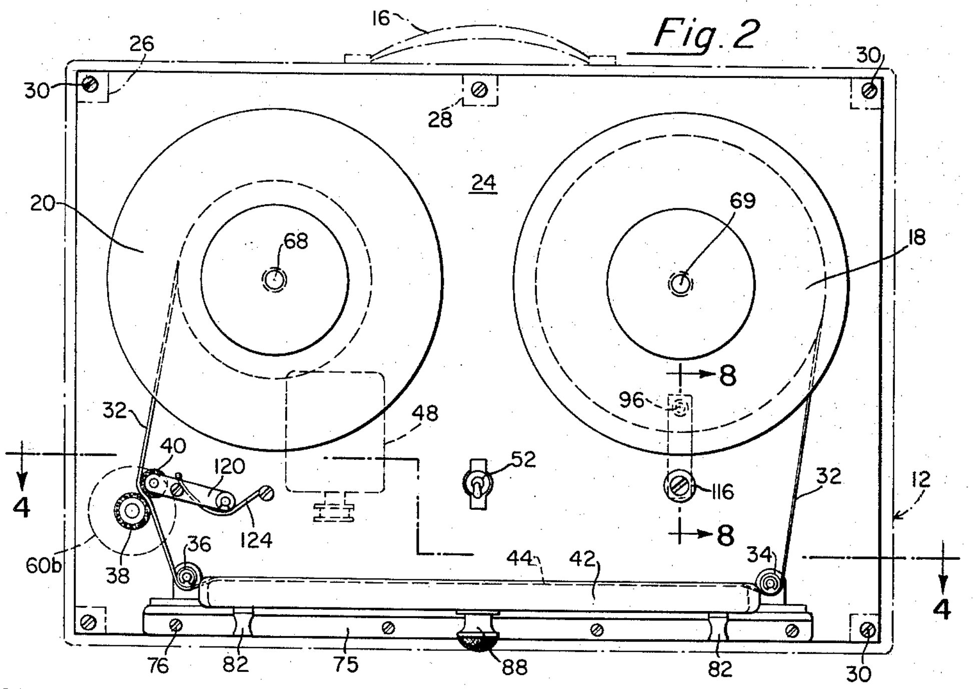
FIG. 2 is a front elevational view of apparatus with the front cover of the carrying case removed and the apparatus in operative condition.
Figure 3:
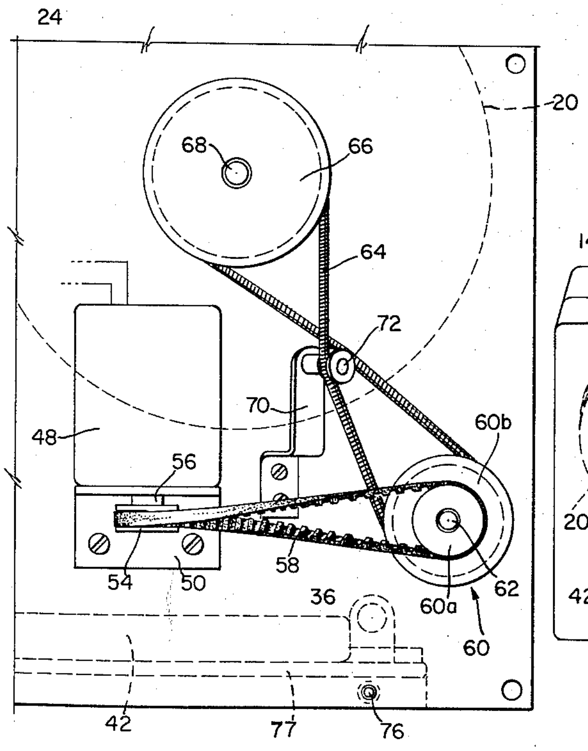
FIG. 3 is a fragmentary enlarged rear elevational view showing the drive means for the tape transport system.
Figures 4, 5, 6, 7, 8:
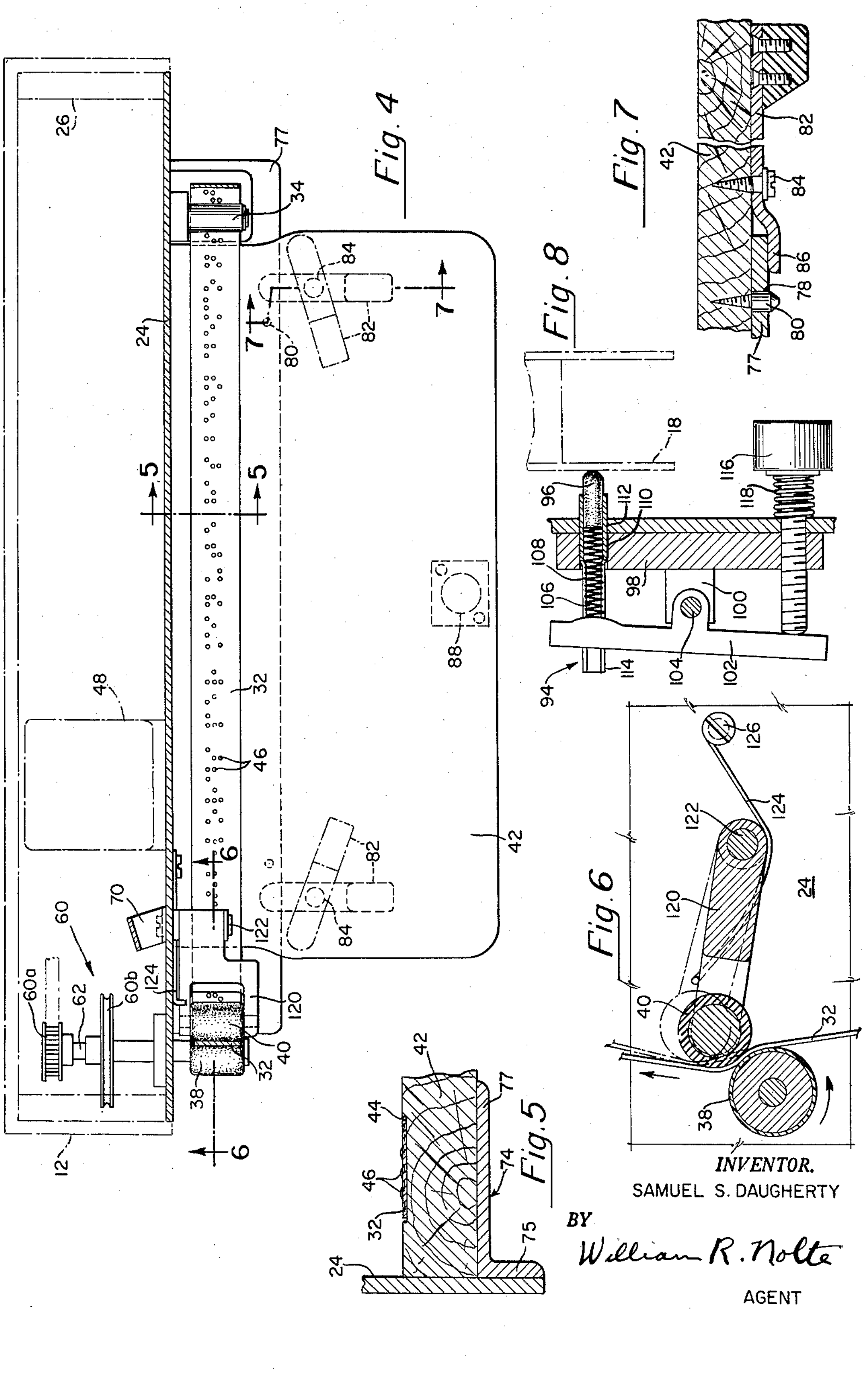
FIG. 4 is a partial sectional view taken along the line 4—4 of FIG. 2 illustrating the hand rest over which the information-bearing tape is passed.
FIG. 5 is an enlarged sectional view taken along the line 5—5 of FIG. 4 showing the raised characters on the tape.
FIG. 6 is an enlarged sectional view taken on the line 6—6 of FIG. 4 to illustrate the drive capstan and its opposed pressure engaging roller.
FIG. 7 is an enlarged sectional view taken along the line 7—7 of FIG. 4 illustrating the means by which the hand rest is secured to the apparatus.
FIG. 8 is a sectional view taken along the line 8—8 of FIG. 2 illustrating the tape tensioning means associated with the supply reel.

With reference now to FIGS. 2, 3 and 4, it is seen that a supply reel 18 and take-up reel 20 are each supported for rotation on central panel 24 which is secured to case portion 12. A plurality of spacer blocks 26 integrally affixed in the four corners of the case and an additional block 28 adjacent the handle 16 receive screws 30 which fasten the panel 24 to the case.

An information bearing tape 32 extending from supply reel 18 is threaded around idler rollers 34, 36, between drive capstan 38 and pressure engaging roll 40, and is then wound around take-up reel 20. As seen in FIGS. 4 and 5, a hand rest 42 disposed at right angles to panel 24 is grooved as at 44 to provide a guideway or track in which the tape 32 bearing raised characters 46 is transported as it moves from one reel to the other. With the hands of the operator supported in a relaxed position on the hand rest 42 the fingers of the hands are free to sense the raised characters on the tape while the same is in continuous motion relative to the board. By slightly increasing the finger pressure with one hand the tape may be stopped leaving the fingers of the other hand free to resense or re-read the arrested tape. Alternatively the tape may be stopped for re-reading by turning off the power to the motor 48 which is affixed to the inner surface of panel 24 by bracket 50, FIG. 3, by the operation of switch 52 located centrally on the outer surface of the supporting panel above the hand rest 42.

Drive pulley 54 affixed to drive shaft 56 of the motor through toothed belt 58 transmits rotation to sheave **60*a* of double pulley 60 affixed to one end of shaft 62 which is rotatably mounted on panel 24. The shaft extends through to the face of the panel to rotate the previously mentioned drive capstan 38. Endless belt 64 crossed over upon itself transmits rotation from sheave 60*b* to sheave 66 mounted on the inner end of take-up pulley shaft 68 which is also rotatably mounted to the central supporting panel and carries the take-up reel 20 on its opposite end. The supply reel 18, in a similar manner, is mounted upon shaft 69 to rotate in unison therewith, the shaft being also suitably journalled for rotation on the supporting panel 24**.

In its portable condition the apparatus of the present invention appears as illustrated in FIG. 1. The hand rest 42, shown in dotted outline, is gripped between the inner surface of the cover of the case 14 and the external face portions of the supply and take-up reels 18 and 20 respectively. In FIGS. 2 and 3, the cover 14 has been removed and the hand rest 42 is shown positioned for use by a blind person. As seen in FIG. 5, the hand rest 42 is shown as resting upon the angle support 74. The vertical flange 75 of the angle support is affixed to the front face of the central panel 24 as by screws 76. With reference to FIG. 7, the horizontal flange 77 is shown as containing locking holes 78 which receive pins 80 integral with hand rest 42 and project from the lower surface thereof. A pair of thumb levers 82 are mounted for pivotal movement on the lower surface of the hand rest 42 as by screws 84 and are jogged as at 86 an amount corresponding to the thickness of the horizontal flange 77 of angle support 74. In one position of rotation of the thumb levers about their respective pivots 84 corresponding to the dotted line disposition of the brackets as seen in FIG. 4, a portion of the flange 77 is engaged between the under surface of the hand rest 42 and the jogged portion of the thumb lever.

With the hand rest 42 in its assembled position, as shown in FIG. 4, means are provided to prevent tipping of the apparatus when the operator's hands are in place on the hand rest. For this purpose the leg 88 is affixed to the under surface of the hand rest 42 to support the same in spaced relationship relative to the surface upon which the apparatus is placed. To permit disassembly of the hand rest, the thumb levers are rotated to their inclined positions, as shown in broken lines in FIG. 4, thus enabling the operator to lift the hand rest so that the pins 80 are disengaged from the flange 74.

In order to maintain a suitable drag on the tape 32 as the same is wound upon the take-up reel 18, brake means 94 which include a spring loaded plunger 96 are associated with the supply reel 18 as illustrated in FIG. 8. A block 98 having a pair of flanges 100 projecting therefrom is affixed to the back surface of panel 24. A lever 102 is pivoted to the flanges by pin 104. The upper extremity of the lever 102 engages spring 106 contained within barrel 108. The forward end of the barrel is received in apertures 110 and 112 of the block and panel 24 respectively. The spring 106 exerts pressure upon plunger 96 housed within the barrel to engage the inner surface of the supply reel. The opposite end of the barrel is slotted as at 114 to receive the upper end of lever 102. The magnitude of the drag or braking action upon supply reel 18 may be regulated by varying the inclination of the lever 102. For this purpose a thumb screw 116 is suitably threaded in the block 98 and panel 24 in a manner to engage and rock the lever 102 about pivot 104 so that the upper end of the lever compresses the plunger spring 106. A spring 118 encircling the thumb screw absorbs vibration and eliminates inadvertent rotation of the screw.

As previously stated, the operator may control and interrupt the advance of the tape 32 by increasing the finger pressure of one hand against the tape. The tape when so stopped permits the fingers of the other hand of the operator to scan and re-read the raised characters contained on the tape which might have been missed during a normal reading operation. One such method of interrupting the movement of a tape which is in transit is contained in the present embodiment of the invention wherein pressure roller 40 is mounted in a manner to permit it to be moved toward and away from the drive capstan 38. For this purpose the pressure roller 40 is journalled for rotation within the yoke of lever 120 which is pivotally mounted to the front face of the panel 24 as at 122. As best seen in FIG. 6, a spring 124 is affixed at one of its ends to the panel by screw 126. The other end of the spring engages the upper surface of the yoke member 120 to urge the same into its full line position as shown in FIG. 6 in which the tape 32 is gripped in compression between the drive capstan 38 and the pressure roller 40. When the tape is stopped by the operator as above, the tension in the tape tends to increase. The motor 48 through belts 58 and 64 respectively continues to positively drive take-up pulley 20 to rotate the same. When the tension in the tape exceeds the frictional resistance of the belt 64 with sheave 66 the belt 64 will slide or slip relative thereto. In this condition, the tension in the tape exerts a force on the pressure roller 40, FIG. 6, to rotate the same clockwise about pivot 122 so that it assumes the phantom line position shown therein. When so moved, the tape 32 is out of driving engagement with respect to the capstan 38.

From the above convenient assemblage of parts it appears that a novel and unitary result is achieved by the cooperation of the parts through the mediation of an operator which in the instant case, comprises the normally continuous advancement of recorded information for sensing by an operator with provision for readily stopping the same for re-reading of the same when desired.

What is claimed is:

1. A reading device for the blind comprising in combination, a supply reel and a take-up reel, each journalled for rotation on the device and adapted to carry therebetween a record medium having raised Braille characters thereon, a hand rest having a planar surface mounted adjacent said reels and adapted to receive a portion of said record medium along said surface thereof, drive means including, a drive roller and an idler roller normally in pressure engagement with each other and disposed between said hand rest and said take-up reel, said idler roller being mounted for movement to a position out of engagement with said drive roller means connected to said drive means for yieldingly driving said take-up reel, whereby upon a predetermined increase in tactile pressure applied by the operator to press a portion of the record medium against the hand rest, the feed of the record medium is arrested thereby causing an increase in tension and corresponding movement of another portion of said record medium which is effective to move said idler roller out of engagement with said drive roller.

2. In a reading device for the blind as described in claim 1 wherein said means mounting said idler roller for movement out of driving engagement with said drive roller include a lever pivoted at one of its ends to said device and bifurcated at its other end to receive said pressure engaging roller for rotation therein, and spring means engaging said lever to urge said idler roller into driving engagement with said drive roller.

3. In a reading device for the blind as described in claim 1 wherein the means for yieldingly driving said take-up reel include an endless coiled spring belt connected between said drive roller and said take-up reel.

4. A Braille reader for the blind, comprising a machine for transporting a record medium bearing indicia in permanent form of raised Braille characters to enable an operator to sense said characters while the record medium is in motion, a supply reel for carrying said record medium, a take-up reel for receiving said record medium from said supply reel, a pair of guide rollers spaced from each other and from said supply and take-up reels for guiding said record medium along a straight line, friction drive means to rotate said take-up reel and adapted to slip at a predetermined frictional level, hand rest means interposed between said guide rollers to support said record medium for passage across a surface thereof and to permit tactile sensing of the record medium by said operator, drive means including first and second members normally operative to advance the record medium therebetween, means for continuously driving said first member, biasing means normally urging said second member toward said first member to advance said record medium therebetween, said biasing means being yieldable to permit movement of said second member away from said first member to interrupt the advance of said record medium therebetween prior to slippage of said friction drive means, whereby upon a predetermined increase in tactile pressure applied by the operator to press a portion of the record medium against a surface of said hand rest means interposed between said guide rollers, the passage of said record medium is arrested thereby causing an increase in tension in said record medium and corresponding movement of another portion thereof which is effective to move said second member out of engagement with said first member.

5. A Braille reader for the blind, comprising a machine for transporting a record medium bearing indicia in permanent form of raised Braille characters, a supply reel adapted to carry said record medium, a take-up reel adapted to receive said record medium from said supply reel, frictional drive means to rotate said take-up reel and adapted to slip at a predetermined frictional level, guide means spaced from each other and from said supply and take-up reels for guiding said record medium along a straight line, hand rest means having a planar surface interposed between said guide rollers and adapted to receive said record medium on said surface, drive means for moving said record medium along the planar surface to permit the raised characters thereon to be sensed by an operator while the record medium is in motion, said drive means including a drive roller and a pressure roller biased in one position into driving engagement with said drive roller to advance said record medium therebetween, said pressure roller being movable to a position out of driving engagement with said drive roller, such movement of said pressure roller being under the control of a biasing means, said biasing means having a degree of bias so related to said predetermined frictional level of said frictional drive means that it will permit movement of said pressure roller out of driving engagement with said drive roller prior to slippage of said friction drive means, whereby upon a predetermined increase in tactile pressure applied by the operator to arrest a portion of the record medium against said planar surface, another portion thereof is effective to move said pressure roller out of engagement with said drive roller against the action of said biasing means, and thereafter with a further increase in tension in said record medium said friction drive means is caused to slip relative to said take-up reel.

References Cited in the file of this patent

UNITED STATES PATENTS

| | | |
|---|---|---|
| 1,178,991 | Brown | Apr. 11, 1916 |
| 2,091,146 | Hamilton | Aug. 24, 1937 |
| 2,412,183 | Taylor | Dec. 3, 1946 |
| 2,521,338 | Bryce et al. | Sept. 5, 1950 |
| 2,929,571 | Baranowski et al. | Mar. 22, 1960 |